United States Patent [19]
Long

[11] Patent Number: 5,098,355
[45] Date of Patent: Mar. 24, 1992

[54] FLOATING RING GEAR AND DIFFERENTIAL GEAR ASSEMBLY

[75] Inventor: James R. Long, Glasgow, Ky.

[73] Assignee: Eaton Corporation, Cleveland, Ohio

[21] Appl. No.: 624,844

[22] Filed: Dec. 5, 1990

[51] Int. Cl.$^5$ .............................................. F16H 1/38
[52] U.S. Cl. .................................. 475/220; 475/230; 475/346
[58] Field of Search .................... 475/220, 230, 346

[56] References Cited

U.S. PATENT DOCUMENTS

| | | | |
|---|---|---|---|
| Re. 17,266 | 4/1929 | Waseige | 475/346 X |
| 1,421,834 | 7/1922 | Ross | 475/230 |
| 2,222,697 | 11/1940 | Armington et al. | 475/346 X |
| 2,241,606 | 5/1941 | Kysor | 475/203 |
| 2,364,411 | 12/1944 | White | 475/230 |
| 2,570,151 | 10/1951 | Petersen | 475/346 X |
| 2,608,261 | 8/1952 | Blazier | 475/230 X |
| 3,000,456 | 9/1961 | Christie | 74/665.6 GB X |
| 3,388,760 | 6/1968 | Christie | 74/650 |
| 3,874,251 | 4/1975 | Lapitsky et al. | 475/230 |
| 4,004,471 | 1/1977 | Keske | 475/346 X |
| 4,182,201 | 1/1980 | Mayhew et al. | 475/230 |
| 4,402,238 | 9/1983 | Craig | 475/230 |
| 4,543,854 | 10/1985 | Roth | 475/230 |
| 4,781,259 | 11/1988 | Yamaoka et al. | 475/230 |

*Primary Examiner*—Leslie A. Braun
*Assistant Examiner*—Matthew Stavish
*Attorney, Agent, or Firm*—A. E. Chrow

[57] ABSTRACT

A ring gear (50) is provided with a plurality of substantially evenly circumferentially spaced posts (10) that extend radially inwardly and are adapted to carry rotary differential pinion gears (12) whose teeth are adapted to meshingly engage the teeth of side gears (18) and (18') respectively secured to the ends of axially aligned spaced-apart axle shafts (20) and (20') to provide a motor vehicle differential gear assembly (100) that enables ring gear (50) to float relative axle shafts (20) and (20') in the space therebetween.

8 Claims, 2 Drawing Sheets

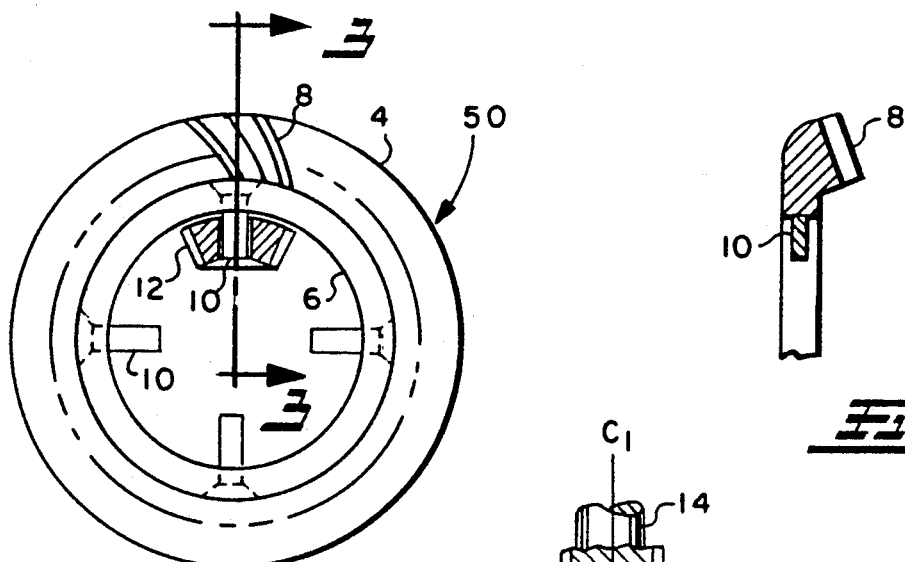
Fig. 2
Fig. 3
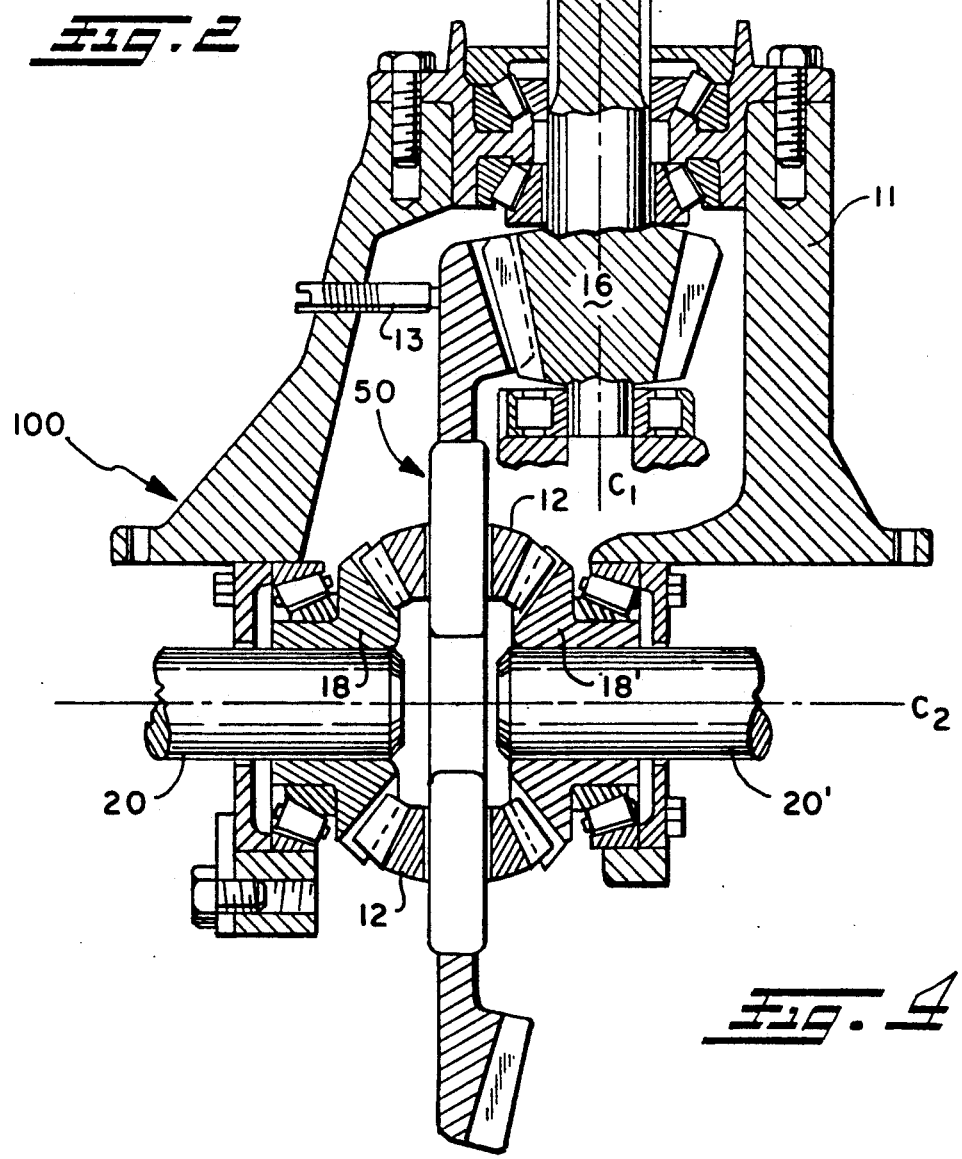
Fig. 4

FLOATING RING GEAR AND DIFFERENTIAL GEAR ASSEMBLY

This invention relates generally to a vehicular differential ring gear and gear assembly for transferring rotational torque between a rotary driver member such as a pinion gear driven by the output shaft of a change gear transmission and a pair of rotary driven members such as paired wheel axle shafts and more particularly to a ring gear and a differential gear assembly using a ring gear that is adapted to be supported by differential pinion gears meshed with side gears respectively rotatably supported in an axle housing and adapted to be secured to the wheel axle shafts and to float relative thereto as the side gears are caused to rotate in response to rotation of the ring gear.

BACKGROUND OF THE INVENTION

Ring gears have been used for many years in motor vehicle differential gear assemblies to transfer rotational torque between a rotary driver member such as the output shaft of a change gear transmission and a pair of rotary driven members such as a pair of substantially axially aligned spaced-apart axle shafts journaled for rotation and having a wheel mounted on their respective outboard ends.

Examples of various types of prior art type motor vehicle differential gear assemblies are disclosed in U.S. Pat. Nos. 2,241,606; 3,000,456; and 3,388,760, the disclosures of which are incorporated herein by reference and the latter two of which are assigned to the assignee of the present invention.

Such prior art type differential gear assemblies however employ a great number of costly components in addition to requiring a large differential housing to protect the numerous components as well as requiring precise alignment between the ring gear and the differential housing and between the differential pinion gears and the side gears as hereinafter described in more detail with respect to the prior art differential gear assembly in FIG. 1.

SUMMARY OF THE INVENTION

Accordingly, it is an object of this invention to provide a ring gear for use with a motor vehicle differential gear assembly that is adapted of float relative a pair of side gears secured to driven members being rotated by the ring gear.

It is another object of this invention to provide a ring gear and a motor vehicle differential gear assembly using a ring gear that is simple and economical to manufacture and that advantageously reduces the number of components heretofore used in vehicle differentials employing ring gears in addition to being adapted to float relative the differential housing and the side gears secured to the driven members and thus lessen the precise alignment heretofor required for the ring gear.

BRIEF DESCRIPTION OF THE DRAWINGS

FIG. 2 is a front view of a ring gear 50 of the invention;

FIG. 3 is a partial central cross-sectional side view taken along view line 2—2 of FIG. 1; and FIG. 4 is a partially sectioned top view of an embodiment of a differential gear assembly 100 of the invention.

DESCRIPTION OF SOME PREFERRED EMBODIMENTS

Figure 1:
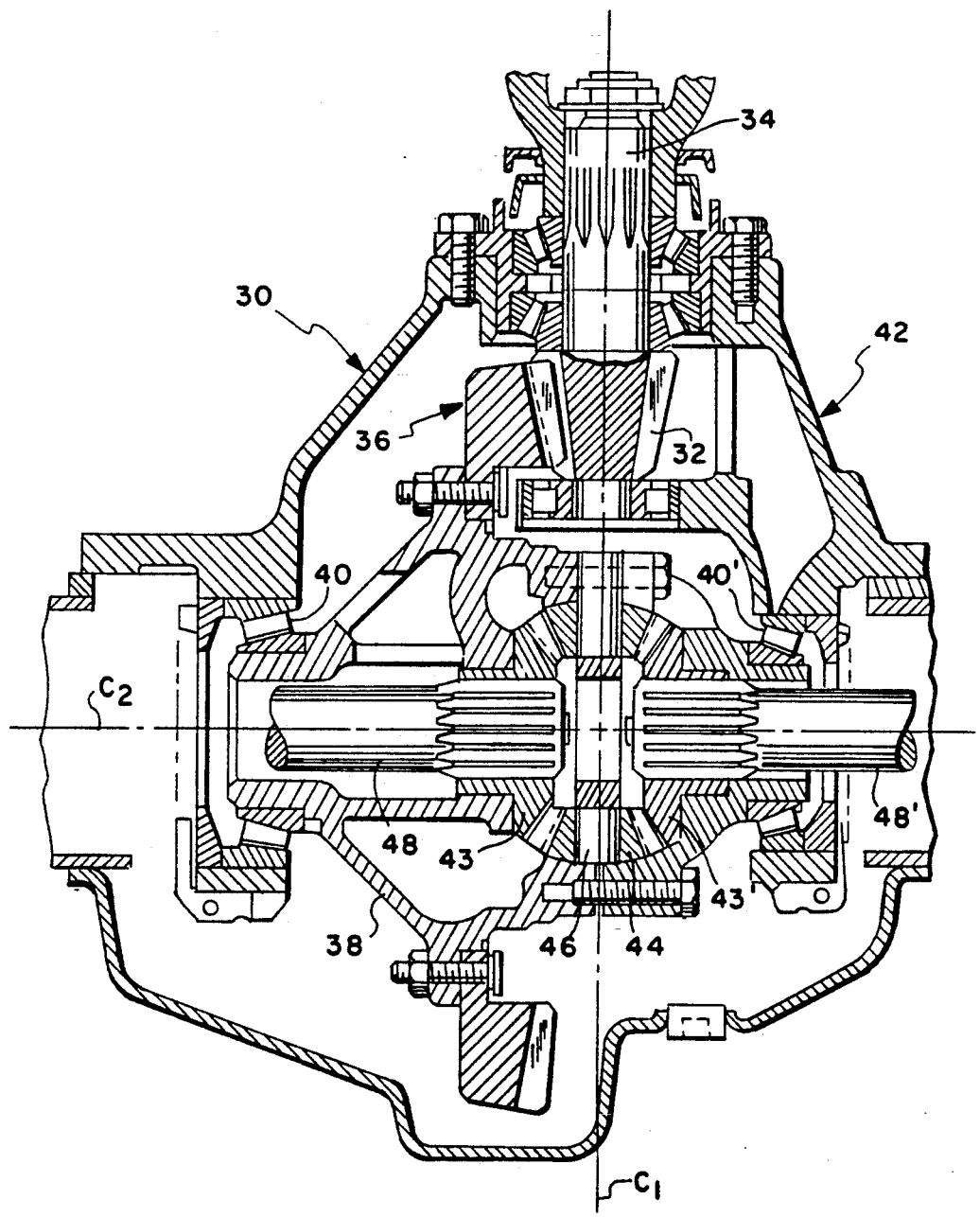
FIG. 1 is a central cross-sectional side view of a prior art differential gear assembly.

The prior art differential gear assembly 30 shown in FIG. 1 is of the type hereinbefore described requiring numerous components and a much larger housing to enclose them.

Assembly 30 is operative to transfer rotary torque from a pinion gear 32 driven by a rotary output shaft 34 of a change gear transmission to a ring gear 36 having teeth meshingly engaged with teeth on ring gear 36. Ring gear 36 is secured to a frame 38 that is journaled for rotation relative housing 42 by means of bearings 40. As such, ring gear 36 and frame 38 rotate coaxially about axle shaft 48 that has an end gear 43 secured to its inboard end by suitable means such as splines. It can thus readily be seen from FIG. 1 that prior art differential gear assemblies required precise and costly alignment between the ring gear and the differential housing.

Axle shaft 48 is spaced-apart from and substantially axially aligned with axle shaft 48' which has an end gear 43' secured to its inboard end in facing relationship to end gear 43. Axle shafts 48 and 48' have a common central rotational axis $C_2$ that is substantially perpendicular to central rotational axis $C_1$ of pinion gear 32.

End gears 43 and 43' are meshingly engaged with at least two equi-circumferentially spaced differential pinion gears 44 that are rotably mounted on frame 38 by means of pins 46. Rotation of frame 38 by ring gears 36 causes differential pinion gears 44 to rotate about axis $C_2$ and in turn cause end gears 43 and 43' to rotate axle shafts 48 and 48' about axis $C_2$ respectively.

As can be seen in FIG. 1, axle shaft 48' is journaled for rotation relative housing 42 by means of bearings 40' and both axle shafts 48 and 48' can be removed from housing 42 with relative ease due to the splined securement with their respective end gears but that precise alignment between ring gear 36 and frame 38 and between differential pinion gears 44 and end gears 43 and 43' is essential.

The ring gear and differential gear assembly of the invention hereinafter described with respect to FIG. 2, 3 and 4 enable the elimination of frame 38 and the bolts required to secure it to ring gear 36 as well as pins 46 in addition to enabling a substantial reduction in the size of housing 42 due to the absence of frame 38 and in addition to enabling the ring gear to float relative the housing and the end gears secured to the axle shafts.

FIG. 2 shows ring gear 50 of the invention that is adapted to float in the motor vehicle differential gear assembly shown in FIG. 4.

Ring gear 50 has a generally annular configuration having a substantially circular outer periphery 4 and a substantially circular inner periphery 6. As shown in FIGS. 2 and 3, ring gear 50 has a plurality of substantially evenly circumferentially spaced teeth 8 extending away from the side thereof between outer periphery 4 and inner periphery 6. Teeth 8 are preferably spiral bevel or hypoid type teeth having a curved tooth path profile as shown in FIG. 2 to enhance smooth engagement with the teeth of pinion gear 16 shown in FIG. 2 which is also preferably provided with curved teeth for promoting smooth continuous mesh with teeth 8 of ring gear 50. The use of spiral bevel or hypoid teeth in vehicle differential gear assemblies to enhance smooth transfer of torque is well known to those skilled in the art and is not therefore reviewed here in detail.

In contrast to prior art type ring gears hereinbefore described, ring gear 50 is provided with at least two and preferably four substantially equi-circumferentially spaced posts 10 (only two referenced) that extend radially inwardly from inner periphery 6 and may be integral therewith or secured thereto by welding or other suitable securement means or may themselves be mounted so that they are rotatable and differential pinion gears 12 are either fixedly secured thereto or rotatably mounted thereupon.

A differential pinion gear 12 is rotatably mounted on each post 10 (only one shown in FIG. 2).

Differential pinion gears 12 have diametrically opposed teeth operative to simultaneously meshingly engage with the teeth of side gears 18 and 18' hereinafter described with respect to differential gear assembly 100 of FIG. 4.

In FIG. 4, a rotary driver member such as output shaft 14 of a vehicle change gear transmission is received through an opening in a housing 11 and suitably journaled for rotation.

Shaft 14 has a pinion gear 16 secured to its end having a central rotational axis referenced by "$C_1$". Central rotational axis "$C_2$" of ring gear 50 is substantially perpendicular to axis $C_1$ and the teeth of both ring gear 50 and pinion gear 16 are adapted to meshingly engage so that ring gear 50 rotates in response to rotation of pinion gear 16.

Housing 11 preferably includes an adjustable screw 13 that is adapted to prevent deflection of the teeth of ring gear 50 away from the teeth of pinion gear 16 to insure meshed engagement therebetween.

Ring gear 50 is disposed in the space between the ends of substantially axially aligned wheel axle shafts 20 and 20' that also have axis "$C_2$" as their common central rotational axis. Side gears 18 and 18' are secured to the spaced-apart facing ends of axle shafts 20 and 20' respectively by suitable securement means such as splines (not shown) and are journaled for rotation therewith. The teeth of side gears 18 and 18' are adapted to meshingly engage with the teeth of differential pinion gears 12 with the combination adapted to provide support for ring gear 50 in the space between the ends of axle shafts 20 and 20' as well as to enable ring gear 50 to rotate axle shafts 20 and 20' as it is rotated by pinion gear 16 in addition to enabling ring gear 50 to "float" within the space between the ends of axle shafts 20 and 20' since it is not fixedly journaled for rotation on housing 11 and thus reducing the precise alignment characteristically required between such components in the past.

What is claimed is:

1. A vehicular differential gear assembly for transferring rotational torque between a pinion gear rotatably driven by a driver member and a pair of substantially axially aligned spaced-apart rotary driven members that are respectively journaled for rotation and have a central rotational axis disposed in substantial perpendicular relationship to the pinion gear central rotational axis and have a side gear secured respectively thereto having their teeth in facing relationship to each other across a space between the driven members, said assembly comprising;

a ring gear disposed in the space between the side gears, said ring gear having an annular configuration defined between an inner periphery and an outer periphery thereof and having a central rotational axis in substantial perpendicular relationship to the pinion gear central rotational axis, said ring gear having a periphery thereof and meshingly engagable with the pinion gear teeth so as to enable the ring gear to be rotatably driven thereby, and said ring gear having at least two equi-circumferentially spaced posts extending radially inwardly from the inner periphery thereof;

a differential pinion gear mounted on each post, each of said pinion gears having diametrically opposed teeth that simultaneously meshingly engage the teeth of both side gears and are adapted in combination therewith to provide support for the ring gear and enable the ring gear to float as the differential pinion gears rotate the side gears in response to rotation of the ring gear by the pinion gear.

2. A ring gear for transferring rotational torque between a pinion gear rotatably driven by a vehicular driver member and a pair of substantially axially aligned spaced-apart rotary driven members that are respectively journaled for rotation and have a central rotational axis disposed in substantial perpendicular relationship to the pinion gear central rotational axis and have a side gear secured respectively thereto having their teeth in facing relationship to each other across a space between the driven members, said ring gear adapted to be disposed in the space between the side gear and having an annular configuration defined between an inner periphery and an outer periphery thereof and having a plurality of substantially equi-circumferentially spaced teeth that are disposed between the inner and outer periphery thereof and meshingly engage with the pinion gear teeth so as to enable the ring gear to be rotatably driven thereby, and said ring gear having at least two equi-circumferentially spaced posts extending radially inwardly from the inner periphery thereof, said posts adapted to respectively carry a differential pinion gear mounted thereon having diametrically opposed teeth that are adapted simultaneously to meshingly engage the teeth of both side gears and, in combination therewith, to provide support for the ring gear and enable the ring gear to float as the differential pinion gears rotate the side gears in response to rotation of the ring gear by the pinion gear.

3. The assembly of claim 1 wherein the ring gear has four of the posts that extend radially inwardly from the inner periphery thereof and respectively have the differential pinion gear mounted thereon.

4. The assembly of claim 1 wherein the ring gear teeth are spiral bevel teeth.

5. The assembly of claim 1 wherein the ring gear teeth are hypoid teeth.

6. The assembly of claim 2 wherein the ring gear has four of the posts that extend radially inwardly from the inner periphery thereof for mounting the differential pinion gear mounted thereon.

7. The ring gear of claim 2 wherein the ring gear teeth are spiral bevel teeth.

8. The ring gear of claim 2 wherein the ring gear teeth are hypoid teeth.

* * * * *